United States Patent [19]

Dowell et al.

[11] 3,951,240
[45] Apr. 20, 1976

[54] FRICTIONAL DISC ARRANGEMENT FOR A DISC BRAKE

[75] Inventors: Frederick S. Dowell; Benedict P. Healy, both of Coventry, England

[73] Assignee: Dunlop Limited, Birmingham, England

[22] Filed: June 18, 1974

[21] Appl. No.: 480,415

Related U.S. Application Data

[63] Continuation-in-part of Ser. No. 293,937, Oct. 2, 1972, abandoned.

[30] Foreign Application Priority Data
Oct. 7, 1971 United Kingdom............... 46582/71

[52] U.S. Cl............................. 188/71.5; 188/251 A; 188/251 M; 192/107 R
[51] Int. Cl.²......................................... F16D 55/40
[58] Field of Search............. 188/71.5, 73.2, 251 R, 188/251 A, 251 M, 218 XL; 192/107 R, 107 M, 70.14

[56] References Cited
UNITED STATES PATENTS

| | | | |
|---|---|---|---|
| 1,864,252 | 6/1932 | McCain et al. | 192/107 R |
| 2,248,383 | 7/1941 | Pogue et al. | 188/71.5 X |
| 2,713,923 | 7/1955 | Eksergion et al. | 188/251 A |
| 2,767,817 | 10/1956 | Davis | 188/218 XL |
| 3,552,533 | 1/1971 | Nitz et al. | 188/251 A X |
| 3,610,383 | 10/1971 | Rosteo | 192/107 R |
| 3,724,612 | 4/1973 | Spain | 188/218 XL |
| 3,747,712 | 7/1973 | Stout | 188/73.2 |

FOREIGN PATENTS OR APPLICATIONS

| | | | |
|---|---|---|---|
| 1,212,367 | 3/1966 | Germany | 188/251 M |

*Primary Examiner*—Trygve M. Blix
*Assistant Examiner*—Edward R. Kazenske
*Attorney, Agent, or Firm*—Stevens, Davis, Miller & Mosher

[57] ABSTRACT

A disc brake comprising a number of interleaved rotor and stator elements and a brake actuator which is arranged to urge the rotor and stator elements into engagement in order to apply the brake. The engagement surfaces of the rotors and stators are provided with areas of carbon and non-carbon based friction material which are arranged so that the disc brake consists of a number of iron friction pairs and a number of carbon friction pairs, the iron friction pairs being located nearer to an open end of the brake structure so that the friction pairs most likely to be wet are those which perform best when wet.

4 Claims, 5 Drawing Figures

FRICTIONAL DISC ARRANGEMENT FOR A DISC BRAKE

This application is a continuation-in-part of our previous U.S. patent application Ser. No. 293,937, filed Oct. 2, 1972, now abandoned.

This invention relates to disc brakes employing carbon based friction materials and, particularly, to multi-plate disc brakes incorporating interleaved rotor and stator elements employing carbon based friction materials for use in aircraft.

In the search for increased braking performance and the ability to maintain this performance at high operating temperatures, considerable interest has been shown in the use of carbon as a disc brake friction material.

The increased performance obtained by the use of carbon as a disc brake friction material has in the past been considerably handicapped by the reduction in friction coefficient of carbon disc brake pads when their surfaces become impregnated by water.

One object of the present invention is to provide an improved disc brake which will alleviate the reduction in performance referred to above.

According to one aspect of the present invention a disc brake comprises a stack of interleaved rotor and stator elements and a brake actuating means arranged to urge the rotor and stator elements into frictional engagement with one another in order to apply the brake, the friction surfaces in the stack including both carbon friction pairs and non-carbon friction pairs.

The interengaging friction surfaces of pairs of adjacent discs may each be entirely carbon, or entirely non-carbon, or adjacent discs may have radially displaced annular areas of different materials giving carbon and non-carbon friction pairs arranged concentrically in a single pair of adjacent discs.

According to a preferred embodiment of the invention, an aircraft wheel braking system includes a stack of interleaved rotor and stator elements including a plurality of carbon-based friction pairs and a plurality of iron-based friction pairs, all of the iron-based friction pairs being located nearer to the thrust member (on the exposed end of the stack) than the carbon based friction pair. The thrust member is for urging the rotor and stator elements into frictional engagement with one another in order to apply the brake.

Several embodiments of the present invention will now be described by way of example with reference to FIGS. 1 to 5 of the accompanying drawings in which.

Figure 1:
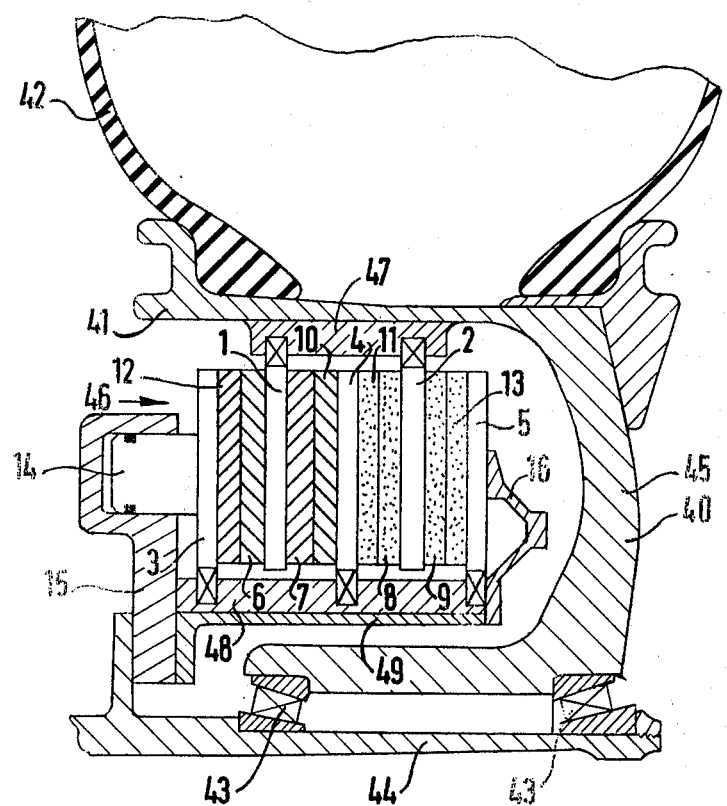
FIG. 1 is a sectional view of a multi-plate disc brake assembled in an aircraft wheel.

The aircraft wheel assembly illustrated in FIG. 1 comprises a wheel 40 which is rotatable on bearings 43 on an axle 44. The wheel 40 has a hub portion 45 and a rim portion 41 on which a pneumatic tire 42 is mounted.

Within the cavity of the rim 41 closed at one end by the hub 45 is a multi-plate disc brake assembly 46. This comprises two annular rotor discs 1 and 2 provided with facings 6, 7, 8, and 9, respectively, of friction material on each side face and a non-rotatable friction pad arrangement in the form of three annular stator discs 3, 4, and 5 interleaved with the rotor discs and provided with friction facings 12, 10, 11, 13, respectively, to engage the facings of the rotors.

The rotor discs 1 and 2 are arranged at their outer peripheries for keying to splines or dogs such as 47 on the inner periphery of the rim 41 of the wheel, while stator discs 3, 4, and 5 are arranged, similarly keyed at their inner peripheries to splines or dogs such as 48 on a torque tube 49 which is fixed relative to the axle 44.

The disc brake is arranged to be actuated by a series of circumferentially spaced hydraulic cylinders 14 reciprocable in an annular support 15 which is affixed to the axle 44. These cylinders are arranged to act directly on stator disc 3 thereby axially compressing the interleaved rotor and stator arrangement, the rotors and stators being free to slide axially on their peripheral keys, against an annular pressure plate 16 affixed to the torque tube 49 which carries the splines 48, the plate 16 directly supporting stator 5 against axial movement and providing the required reaction force to sandwich the whole rotor and stator arrangement, thereby achieving the required braking effect.

In the disc brake arrangement shown in FIG. 1 rotor 1 and stator 3 are provided with iron-based friction facings 6, 7, and 12 while rotor 2 and stator 5 are provided with carbon-based friction facings 8, 9, and 13. The central stator 4 is provided with an iron-based facing 10 to engage iron-based rotor facing 7 and a carbon-based facing 11 to engage carbon-based rotor facing 8. Thus 50 per cent of the friction material of the brake is carbon-based and 50 per cent iron-based.

Carbon-based friction materials are formed predominantly from carbon and, for example, mixtures of molded carbon and graphite crystalline structures, or pure carbon or graphite or alternatively graphite fibers in a carbon or graphite matrix. Non-carbon based friction materials may have a minor proportion of carbon or graphite but consist mainly of sintered mixtures of metals and ceramics, for example, an iron-based material may consist, by volume, of approximately 70 per cent iron and 30 per cent ceramic materials.

Certain carbon-based friction materials are available with very good friction and wear properties except for a reduction in friction coefficient ($u$) when water impregnated. In dry conditions the coefficient of friction may be of the order of 0.3 to 0.4 but may fall drastically when wet to about 0.1. Iron-based pads have a dry $u$ value of the order of 0.2 to 0.3 but this value is virtually unaffected by water.

Thus, if we consider the disc brake arrangement shown in FIG. 1, in which 50 per cent of the brake friction material is iron-based and 50 per cent carbon-based, assuming dry and wet values of 0.4 to 0.1 respectively for the carbon-based material, the brake will retain 57 per cent of its dry braking effect when the carbon-based material becomes impregnated with water whereas an all-carbon-based material brake would only retain 25 per cent of its dry braking effect under similar conditions.

It will be noted that the iron-based friction facings 12, 6, 7, 10 are provided at the end of the disc pack nearer the thrust-applying devices 14, while the carbon-based friction facings 11, 8, 9, and 13 are provided at the end of the disc pack nearer the reaction plate 16. Owing to the provision of hydraulic circuitry (not shown) for the thrust-applying devices 14, the latter must be located at the open end of the chamber defined by the wheel rim 41 and the wheel hub 45 and the reaction plate 16 must be at the closed end of the chamber adjacent the wheel hub 45. Consequently the discs 3, 1, and 4 of the pack nearer the thrust devices 14 are more likely to become wet than those (2 and 5) nearer the reaction plate 16, the latter being better protected by the closed end of the chamber from wetting by rain or water thrown up from the runway.

In the disc brake illustrated in FIG. 1 those facings positioned to be most susceptible to wetting are those which perform best when wet, namely the iron-based facings 12, 6, 7, and 10, and the facings positioned to be least susceptible to wetting are the carbon-based facings 11, 8, 9, and 13. By this arrangement of the facings a brake is obtained which has the advantages of carbon-based friction facings but which has a greatly improved performance under wet conditions by virtue of the provision of iron-based facings at the locations most subject to wetting. Furthermore at least most of the water which would wet the carbon-based facings must find its way through the chamber defined by the rim 41 and hub 45, over and in close proximity to, the iron-based facings 12, 6, 7, 10, but rapid heating of the latter will tend to evaporate at least some of this water before it ever reaches the carbon-based facings 11, 8, 9, 13.

The friction facings may conveniently be applied to the rotor and stator disc as a series of circumferentially spaced pads.

Figure 2:
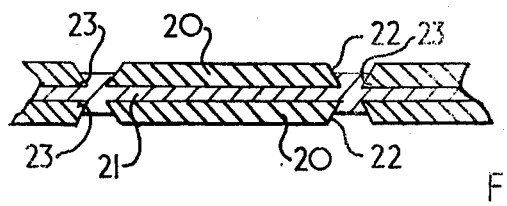
FIG. 2 shows a way of mounting iron-based friction pads on a rotor or stator.

FIG. 2 shows a way of mounting iron-based friction pads 20 on a rotor or stator backing member 21.

The pads 20 are provided with chamfered edges 22 which locate in correspondingly dove-tailed recesses 23 provided in each side of the backing member 21.

Figure 3:
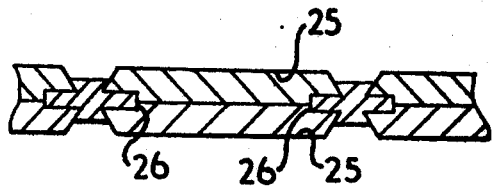
FIG. 3 shows a second way of mounting iron-based friction pads.

When the pads are mounted in the above manner part of the backing member 21 is sandwiched between the friction pads 20, but in a further embodiment shown in FIG. 3, the part of the backing member between the friction pads 25 is removed and the pads are provided with shoulders 26 such that the friction pads extend right through the cross-section of the rotor or stator thereby improving the thermal conduction of the brake member.

Figure 4:
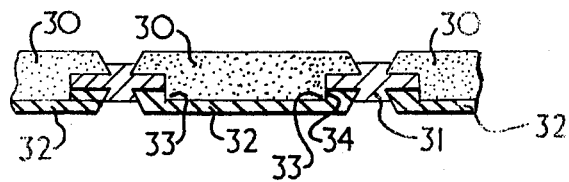
FIG. 4 shows a way of mounting carbon-based and iron-based friction pads respectively on opposite sides of a rotor or stator.

FIG. 4 shows a suitable method of mounting carbon-based friction pads 30 on one side of a rotor or stator 31 and iron-based pads 32 on the other side of the stator or rotor. The dove-tailed arrangement previously described is employed to locate the pads, and the carbon pads 30 are provided with protrusions 33 which locate in corresponding recesses 34 provided in the iron-based pads 32. Thus the proportion of carbon is increased thereby reducing the weight and improving the weight-for-weight heat capacity of the member.

The invention is not limited to the carbon and iron-based arrangements shown in FIGS. 1 to 4 of the accompanying drawings. Instead, any non-carbon-based friction material which is not adversely affected by water such as bronze or ceramic-based materials may be used, in any suitable ratio with the carbon-based material, in place of or in addition to the iron-based material.

Figure 5:
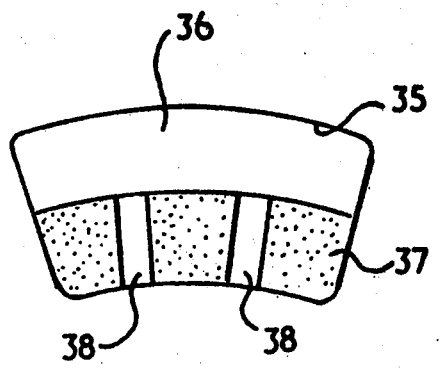
FIG. 5 shows a friction pad with carbon and iron-based friction material on the same face.

Many variations on the construction described above are possible within the scope of the present invention. FIG. 5 shows an example of an alternative construction in which the radially outer portion 35 of each pad 36 is made from an iron-based material and the radially inner portion 37 of each pad is made from carbon-based material. In order to ensure uniform wear across the radial width of the composite friction pad the wear characteristics of the two materials should be similar, or their relative face areas adjusted to compensate, as shown in FIG. 5 where the area of carbon material is arranged to be less than that of the iron-based material by leaving gaps 38 between the areas of carbon material, thereby compensating for the lower wear rate of the carbon material.

A rotor or stator disc having carbon and non-carbon pads mounted as shown in FIG. 5 would in a brake assembly, be arranged to engage a correspondingly arranged adjacent disc, ensuring that the carbon-based pads of the two discs engage one another and the iron-based pads engage one another.

An additional advantage of the provision of iron-based and carbon-based friction facings in the same disc pack is that the greater heat generated by the iron-based facings when all the facings are wet tends to evaporate water on or passing toward the carbon-based facings, thereby drying the latter or protecting them from wetting, and maintaining or re-establishing the optimum operating conditions for the carbon-based facings.

Embodiments in which iron-based and carbon-based pads are mounted on the same disc, and especially that of FIG. 4, where the pads are contiguous, maximize this advantage by promoting heat transfer between the iron-based and carbon-based pads.

The invention also provides a braking system for a multi-wheel aircraft undercarriage unit comprising a multi-plate disc brake arrangement as in any of the embodiments described above fitted to each wheel of the undercarriage unit, so that each brake unit comprises a stack of interleaved carbon and non-carbon friction pairs. The carbon-based brakes and non carbon-based brakes should preferably be symmetrically disposed relative to an aircraft's longitudinal axis to balance any unequal brake torques.

Having now described our invention — what we claim is:

1. An aircraft disc brake comprising a pack of interleaved rotor and stator elements located within an aircraft wheel, the wheel having a rim which is closed at one end by a hub and which is open at its other end, a reaction member at the end of the disc pack nearer the wheel hub and a brake actuating thrust member at the end of the disc pack nearer the open end of the wheel rim for urging the pack against the reaction member to thereby urge the rotor and stator elements into frictional engagement with one another to apply the brake, the pack including friction surfaces of both a plurality of iron-based friction pairs, and a plurality of carbon-based friction pairs, all of the iron-based friction pairs being located nearer to the open end of the wheel rim than the carbon-based friction pairs.

2. A brake as claimed in claim 1, wherein carbon-based and iron-based friction surfaces are provided on opposite sides of one of said stator elements or rotor elements.

3. A disc brake comprising a stack of interleaved rotor and stator elements and a brake actuating means arranged for urging the rotor and stator elements into frictional engagement with one another in order to apply the brake, the stack including friction surfaces of both carbon and non-carbon friction pairs, said friction surfaces being formed by pads, the carbon-based and non-carbon-based friction pads being positioned respectively on opposite sides of one of said stator elements or rotor elements, said carbon-based friction pads being provided with the protrusions which locate in corresponding recesses provided in the non-carbon-based pads.

4. An aircraft disc brake comprising a pack of interleaved rotor and stator elements located within an aircraft wheel co-axially with respect to the wheel rim, a reaction member at the end of the disc pack nearer the wheel body and a brake actuating thrust member at the other end of the disc pack for urging the pack against the reaction member to thereby urge the rotor and stator elements into frictional engagement with one another to apply the brake, the pack including friction surfaces of both at least one carbon-based frictio pair, and at least one iron-based friction pair, the iron-based friction pair being located nearer to the thrust member than the carbon-based friction pair, such carbon-based and iron-based friction surfaces being located on opposite sides of one of said stator elements or rotor elements, the surfaces being formed by pads, the carbon-based friction pads having protrusions which locate in corresponding recesses in the iron-based pads.

\* \* \* \* \*